April 14, 1959     H. W. BARTLETT     2,881,919
SPOT SCANNER FOR COMESTIBLES
Filed April 5, 1954     6 Sheets-Sheet 1

INVENTOR,
HAROLD W. BARTLETT
BY
ATTORNEYS

April 14, 1959    H. W. BARTLETT    2,881,919
SPOT SCANNER FOR COMESTIBLES
Filed April 5, 1954    6 Sheets-Sheet 2

INVENTOR,
HAROLD W. BARTLETT
BY Lyon & Lyon
ATTORNEYS

INVENTOR,
HAROLD W. BARTLETT
BY
*Lyon & Lyon*
ATTORNEYS

Fig. 15.

INVENTOR,
HAROLD W. BARTLETT
BY Lyon & Lyon
ATTORNEYS

United States Patent Office 2,881,919
Patented Apr. 14, 1959

2,881,919

SPOT SCANNER FOR COMESTIBLES

Harold W. Bartlett, Berkeley, Calif., assignor to California Packing Corporation, San Francisco, Calif., a corporation of New York Application April 5, 1954, Serial No. 420,871

12 Claims. (Cl. 209—111)

The present invention relates to means and techniques useful in inspection of articles, such as, for example, comestibles, to determine whether or not the outer surfaces of such articles meet certain standards, and has particular applicability in an arrangement as described herein for automatically and continuously inspecting comestibles, such as peaches, for objectionable spots, the term "spots" as used herein denoting bruises, wax spots, discolored portions and the like, a peach pit or fragments thereof, and, in general, other surface blemishes. The invention, of course, is not limited to such specific use but is applicable also to the inspection of other articles and food products, such as vegetables and fruits, both fresh and dried, and peeled or unpeeled.

It is therefore a general object of the present invention to provide improved means and techniques of the character outlined above.

Another object of the present invention is to provide a commercially practical arrangement for inspecting incremental portions of comestibles and sorting the same according to small spots or imperfections on the outer surface thereof, the arrangement being characterized by the fact that it depends for its operation on the intensity of light reflected from the comestibles.

Another object of the present invention is to provide an improved arrangement of this character involving photo cells which are connected and energized in a novel manner to achieve a practical spot detecting arrangement.

Yet another object of the present invention is to provide an improved spot detecting arrangement in which articles to be sorted are moved past a scanning head, at an inspection station, to derive from said articles intelligence as to the condition of their outer surfaces, such arrangement having associated therewith a time delay mechanism, or memory apparatus, whereby such intelligence is used to deflect such article after it passes an appreciable distance beyond the scanning head.

Still a further object of the present invention is to provide an arrangement of this character featured by the fact that the results obtained are in accordance with the intensity of light reflected in the visible spectrum and are substantially unaffected by radiation occurring outside the visible spectrum, such as radiation in the infrared, due particularly to the reflectance from the chlorophyll of the comestible.

Still another object of the present invention is to provide an improved spot detecting arrangement for inspecting and sorting articles with chlorophyll content, depending for its operation on the use of light reflected from such articles.

Still another important object of the present invention is to provide an arrangement of this character which depends for its operation on the use of diffused light so that highlights from the comestibles are eliminated and satisfactory readings are obtained.

Another object of the present invention is to provide improved means of this character whereby photo cell means is arranged to receive reflected light progressively from different fractional portions of the object so as to obtain, in effect, a scanning action.

Yet another object of the present invention is to provide an improved arrangement of this character which embodies the concept of viewing only a fractional part of a peach half, i.e., a circle having a diameter of approximately ⅜", while the peach half continuously moves, to effect a scanning action during which a multiplicity of measurements (which may be considered to be an infinite number of measurements) are produced with sorting of the peach half accomplished, however, in accordance with only one of such measurements, with the result that the peach half is segregated when the same has only a relatively small objectionable spot.

Another object of the present invention is to provide an arrangement of this character which is sufficiently sensitive to detect a spot having an exposed area as small as 10% of the area viewed by a particular photo cell, i.e., 10% of a ⅜" circle.

Another object of the present invention is to provide an arrangement of this character which is particularly sensitive to reflected light having wave lengths in the range between 500 and 700 millimicrons in which differences in light reflected on the one hand from a perfect peach and on the other hand a spot on a peach is quite pronounced to thereby achieve the desired discrimination.

Another object of the present invention is to provide an arrangement of this character in which each of the plurality of photo cells in uniquely associated with a corresponding so-called "electrometer" tube such that the measuring system is easy and convenient to adjust and the system is sufficiently fast for practical application.

Another object of the present invention is to provide a system of this character for inspecting objects having curved surfaces with the viewing photo cells arranged in a unique manner such that all portions of a peach half are viewed, at one particular time but not necessarily at the same time, by such photo cells at an angle less than 45°, such angle being defined by two lines, one line being normal to the surface of that portion of the peach half being viewed, and the other line being the axis along which the photo cell views such portion.

Another object of the present invention is to provide an arrangement of this character involving a plurality of photo cells, each arranged to view and scan different selected portions or corresponding zones of an object to derive measurements of the light reflecting properties of the outer surface of the object with measurements produced by such photo cells, however, being effectively discontinued when and as the object leaves the field of view.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

*General functioning of system*

Figure 1:
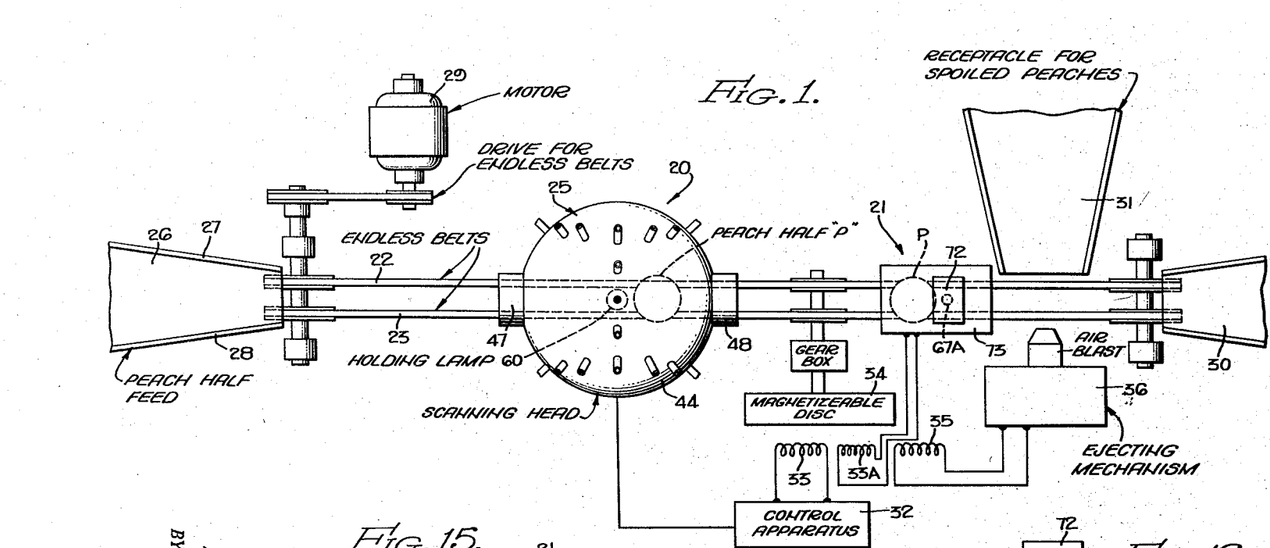
Figure 1 shows an arrangement embodying features of the present invention, partly in structural and partly in schematic form.

A representation of the apparatus is shown in Figure 1 and includes means for transporting peach halves P with their semihemispherical convex sides or faces upwardly for viewing and scanning by a first plurality of photo cells located at inspection station 20 and by a second plurality of photo cells located at inspection station 21. This peach half transporting means is represented diagrammatically as a pair of endless belts 22, 23 upon which the peach halves are disposed for travel under the scanning head 25 at station 20, which includes seventeen photo cells.

The peach halves travel in single file under the scanning head 25 and for that purpose are moved into the continuously moving belts 22, 23 from the table 26 having converging guiding walls 27, 28. The belts 22, 23 are driven through conventional means by the motor 29.

When and as the individual peach halves travel under the scanning head 25, intelligence is derived as to the spotted or unspotted condition of each peach half, and this intelligence is utilized either to allow the inspected peach half to travel into a suitable hopper 30 in case the peach half is unspotted or to eject the peach half into the hopper 31 in case the peach half is spotted. Such intelligence is derived using control apparatus, a portion of which is illustrated by the block 32.

In the event that the inspected peach half is a spotted one, the magnetizing coil 33 is energized to magnetize a portion of the rotating magnetizable disk 34. The disk 34 is rotated in synchronism with movement of the belts 22, 23, and when the magnetized region of the disk is rotated to a position adjacent the pickup coil 35, voltage is induced in such pickup coil 35 to cause operation of the ejecting mechanism represented diagrammatically by the block 36. This ejecting mechanism 36 preferably includes means for developing an air blast as described and claimed in my copending application, Serial No. 232,975, filed June 22, 1951, now U.S. Letters Patent 2,713,409, and assigned to the same assignee. The air blast, when produced, serves to blow the spotted or objectionable peach half from the belts 22, 23 into the receptacle 31.

Inspection of the upper convex side of the peach half is accomplished at inspection station 20 and, likewise and subsequently, inspection of the underside of the peach half is accomplished at inspection station 21, at which five photo cells are disposed to measure the light reflected from the underside of the peach half. The result of the measurements at inspection station 21 is likewise (in the case of a measurement of a spot), in the form of a voltage which is applied to a coil 33A, which is for the same purpose and functions the same as coil 33, namely, to produce a magnetized spot on disc 34. This spot later, with suitable time delay, causes a voltage to be induced in pickup coil 35 to effect operation of the ejecting mechanism when the peach half is adjacent the receptacle 31 into which, at that time, it is blown by the air blast.

It is contemplated that all peach halves, prior to inspection, are peeled, washed and graded in size so that one particular machine, as described herein, handles and inspects peaches of one size only.

*Illumination of peach half at first inspection station 20*

The scanning head 25 incorporates means for illuminating peach halves travelling thereunder, such illuminating means comprising a plurality of lamp bulbs 37, 38, 39, 40, 41 and 42 (Figures 2 and 14), mounted on and extending within the circular or hemispherical shaped dome reflector portion 44.

Figure 2:
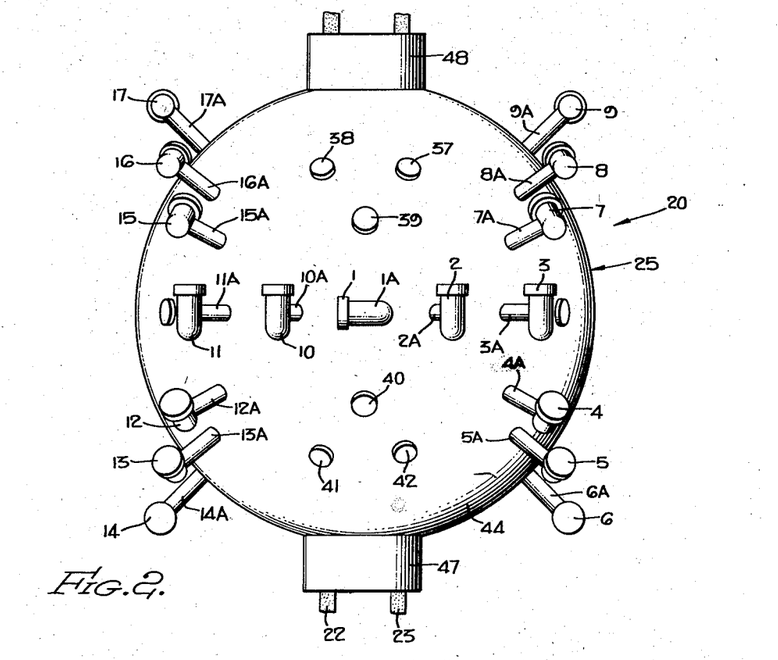
Figure 2 is a top plan view of the scanning head shown in Figure 1.
Figure 3:
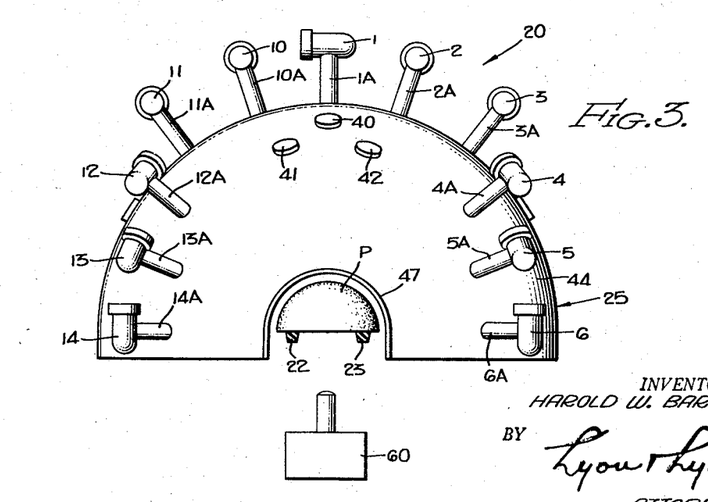
Figure 3 is an end elevational view of the scanning head illustrated in Figure 2, such scanning head being shown in relationship to a pair of endless belts upon which a peach half is being transported and in relationship to a light source for producing a holding or biasing action.
Figure 4:
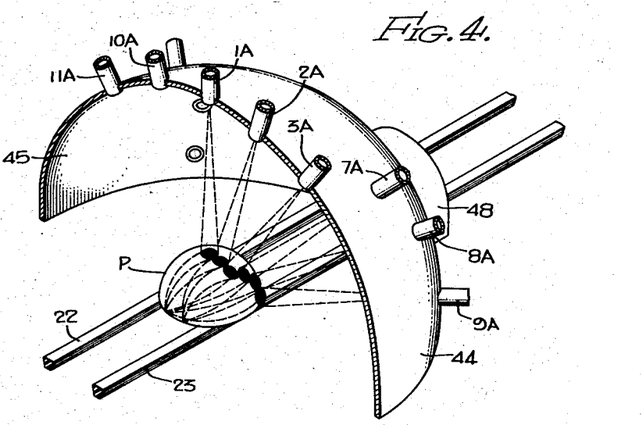
Figure 4 is a perspective view of a portion of the scanning head illustrated in the previous figures and serves to illustrate the manner in which the different photo cells view different circular portions of the peach half to produce a scanning action when and as the peach half is transported on the endless belt shown therein.
Figure 5:
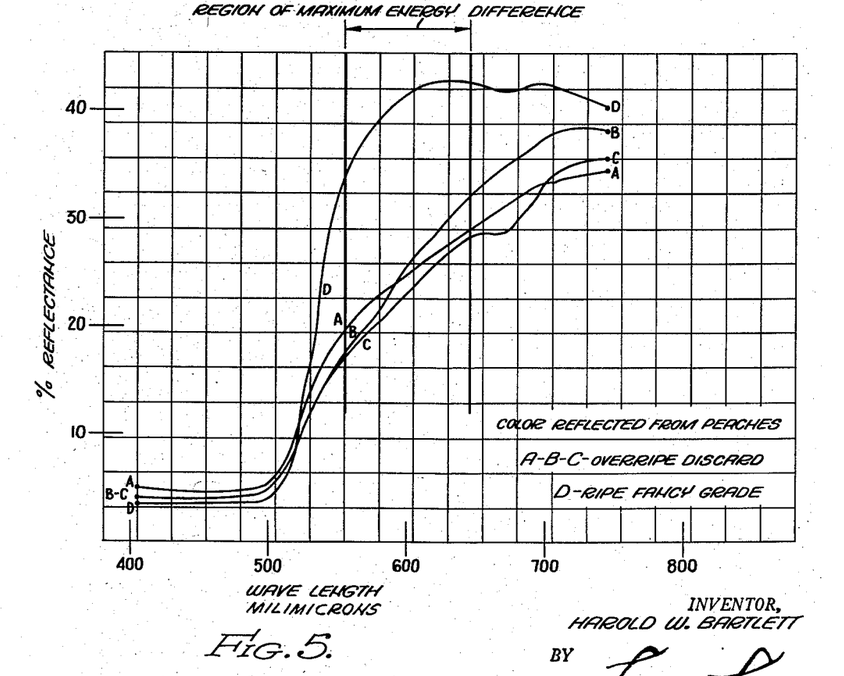
Figure 5 is a graphical representation showing as ordinates, percent reflectance, and as abscissa, the wave length of the reflected light expressed in millimicrons (mm.). The curve D is the reflectance curve for a ripe fancy grade peach whereas the other curves, A, B and C, show the reflectance curves for over-ripe peach halves that normally are discarded as being too dark.
Figures 6, 7, 8, 9, 10, 11, 12:
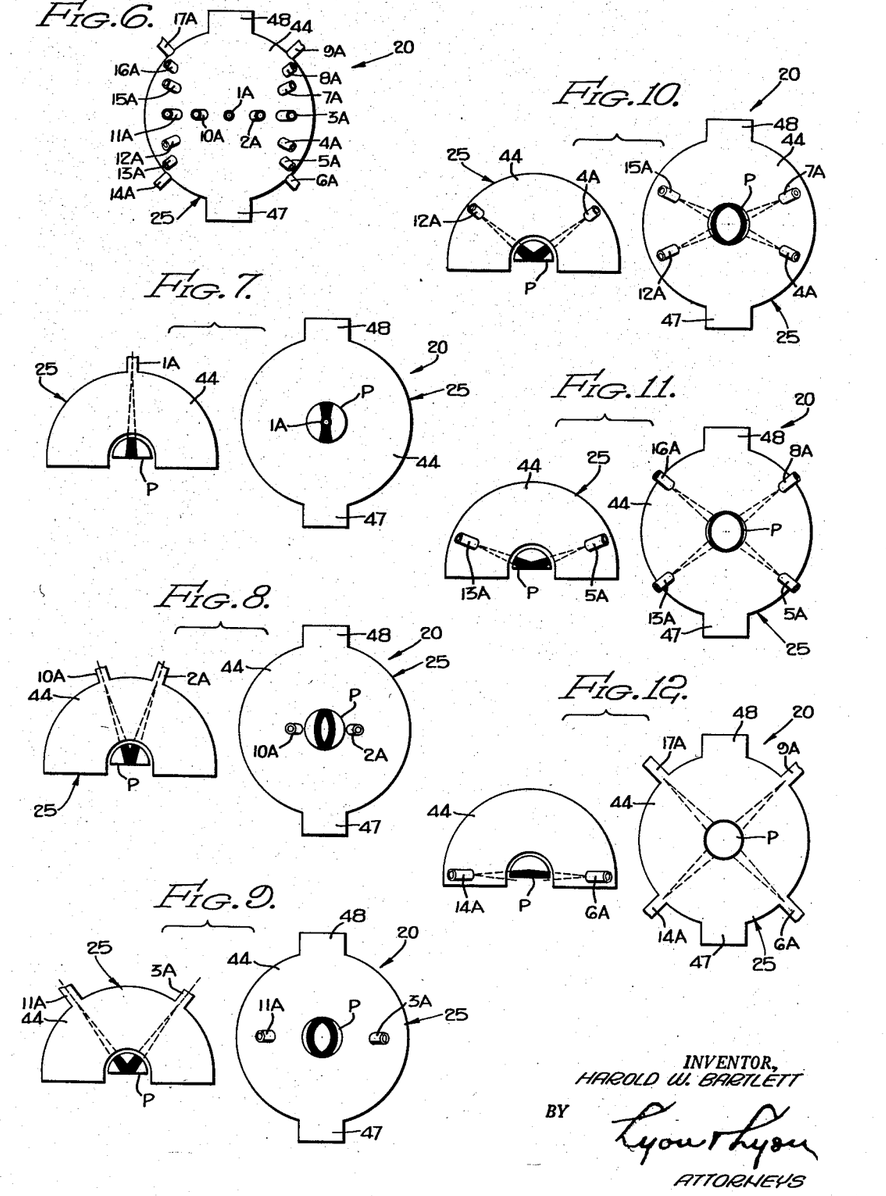
Figure 6 is a view similar to Figure 2 and shows the orientation of the different light tubes in the scanning head, it being noted that seventeen photo cells are mounted on the scanning head and have the reference numerals 1–17, both inclusive, while the corresponding light tubes have the reference numerals 1A–17A, respectively.
Figure 7 illustrates, by shading, that zone of a peach half scanned by the photo cell 1 in communication with light tube 1A.
Figure 8 illustrates, by shading, those zones of the peach half scanned by the photo cells 2 and 10 in communication, respectively, with light tubes 2A and 10A.
Figure 9 illustrates, by shading, those zones of the peach half scanned by the photo cells 3 and 11 in communication, respectively, with light tubes 3A and 11A.
Figure 10 illustrates, by shading, those zones of the peach half scanned by the photo cells 4, 7, 12 and 15 associated, respectively, with light tubes 4A, 7A, 12A and 15A.
Figure 11 illustrates, by shading, those zones of the peach half scanned by the photo cells 5, 8, 13 and 16 in communication, respectively, with the light tubes 5A, 8A, 13A and 16A.
Figure 12 illustrates, by shading, those zones of the peach half scanned by the photo cells 6, 9, 14 and 17 in communication, respectively, with the light tubes 6A, 9A, 14A and 17A.

In accordance with one feature of the present invention, the light produced by such lamp bulbs is diffused. The lamp bulbs are six in number, spaced as shown in Figure 2 and the light produced thereby is diffused so that a traveling peach half, while under the scanning head and being viewed, is illuminated solely with diffused light. Such light diffusion is accomplished by rendering the most inward portions of the glass bulbs of such lamp bulbs opaque to the transmission of light that might otherwise shine directly on the peach and by painting the inner surface of the dome 44 with a thin layer 45 of light diffusing paint. The lamp bulbs may be so prepared by painting such most inward portion of the glass bulbs with a spot 49 (Figure 14), of the white or aluminum paint.

It is observed that the dome 44 is of sufficiently large dimension that it also serves as a light shield, shielding a peach half, while it is located centrally, from light emanating from extraneous sources.

To additionally assure such shielding action, the dome 44 has integrally formed therewith, the two semi-cylindrical tunnel portions 47 and 48 through which a peach half enters and leaves.

The diffused light thus reflected from the peach half is measured in a manner involving seventeen photo cells, 1–17 as described in detail hereinafter.

*Illumination of peach half at second inspection station 21*

Figures 16, 17:
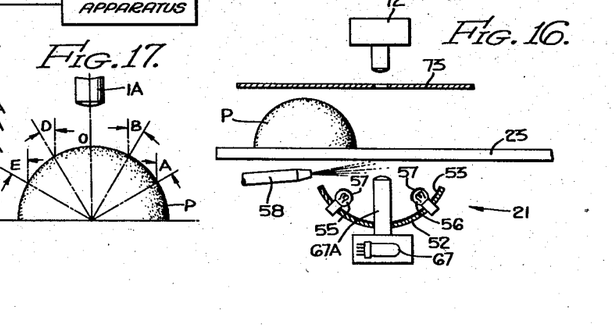
Figure 17 serves to illustrate the manner in which the viewing angle changes with relative movement between a peach half and a viewing photo cell.

The underside of the peach half is illuminated with diffused light in the same manner as described above, using almost identical equipment. Such equipment as shown in Figure 16 comprises a light reflector and shield 52 painted with light diffusing paint 53, a plurality of lamp bulbs represented by bulbs 55, 56, which have their outer tips painted with a light opaque paint 57.

Preferably a means is used, as exemplified by air nozzle 58, to provide a stream of air above the hood 52 so as to prevent moisture and solid particles from falling into the hood, particularly when as contemplated the peach halves are subjected to inspection after first peeling and then washing.

*Optical arrangement of 17 photo cells at first inspection station 20*

Figures 7 to 12 illustrate the manner in which the 17 photo cells 1 to 17 with corresponding light tubes 1A to 17A, view different but slightly over-lapping portions of the convex side of a peach half, in the different positions of the peach half.

It is understood that, at any one particular instant, a photo cell views an area of the peach half, defined by a ⅜" circle and that the shaded portions in the figures indicate the zones which are scanned as a result of movement of the peach half. It is noted that for an average size peach half having an average diameter of approximately 2¾", the area of the ⅜" viewing circle is approximately 2% of the outer convex surface area of the peach half.

The first photo cell 1, serves not only as a viewing tube, but also as a timing tube and for the latter purpose receives lighting from the biasing or holding lamp source 60 when and only when a peach half is not being viewed by all the other photo cells.

At the instant the leading edge of the peach half interrupts the light beam which normally impinges on photo cell 1 from source 60, the majority of photo cells view a portion of the peach half.

At this particular instant, the majority of the 17 photo cells view substantially the same portion of the peach half at the forwardmost portion of the peach half. For this purpose, the axes of the light tubes are directed to one such portion.

During movement of the peach half from such initial position, different zones of the peach half are scanned as indicated by the shaded portions. It is observed that just before the peach half leaves the field of view the majority of the photo cells again view a common portion of the peach half at the rearwardmost portion of the peach half.

The above is perhaps more evident from the fact that all the shaded zones in Figures 7 to 12 begin at a first common portion of a peach half and terminate on a second common portion of the peach half. Seventeen photo cells are used for this purpose and are so arranged that all portions of the peach half are viewed at an angle less than 45 degrees, by at least one photo cell, at one particular time during the scanning operation, but not necessarily at the same time, such angle being defined by two lines, one of which is the viewing axis of a light tube and the other one of which is that normal to the particular portion of the peach half under consideration. Using this teaching, spurious and inaccurate results are avoided.

While it is permissible for a photo cell to view a portion of the peach half at an angle greater than 45 degrees, the measurements taken at such undesirable large angles are not necessarily controlling as to whether or not the particular portion is spotted, since in some cases, the presence of a spot is obscured and may not be observed within practical limits, particularly when the spot is small. In this respect, it is observed that measurements are made with respect to the intensity of reflected light and that the intensity as viewed by a particular photo cell changes with the viewing angle as indicated in Fig. 17.

*Optical arrangement of five photo cells at second inspection station 21*

Figure 15:
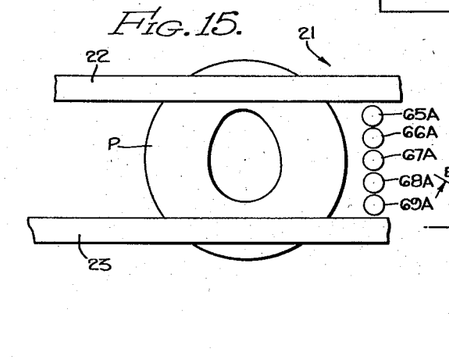
Figures 15 and 16 illustrate a portion of the apparatus illustrated in Figure 1 for inspecting the pit cavity side of a peach half using five photo cells, each of which serves to measure the light reflected from the bottom side of the peach half with one of such photo cells connected, however, as a timing tube for itself and the other four photo cells in the manner described in connection with Figures 13 and 14, Figure 15 being a view looking upwardly, of a peach half carried by the endless belts at the second inspection station in Figure 1, and Figure 16 being a view, partly in section, viewing such second inspection station from the side.

As shown in Figs. 15 and 16, five light tubes 65A, 66A, 67A, 68A and 69A are arranged with their axes parallel and in a line extending perpendicular to the direction of belt travel and between the belts 22, 23 so that different, but slightly overlapping portions of a peach half may be viewed by photo cells 65, 66, 67, 68 and 69 respectively in communication with the corresponding light tubes 65A, 66A, 67A, 68A and 69A. Besides serving as a viewing tube the center tube, tube 67A and associated photo cell 67 is used for timing purposes as described above in connection with photo cell 1. For timing purposes, a biasing or holding lamp source 72 is provided and arranged to project a beam of light through a circular aperture in plate 73 into the light tube 67A and onto photo cell 67. Such beam of light however is interrupted when a peach half is in a viewing or scanning position to perform a control operation as described hereinafter. At the instant the light beam is interrupted the other photo cells 65, 66, 68 and 69 are viewing and receiving the diffused light reflected from the underside of reflecting plate 73 so that such photo cells are prevented at this particular instant from falsely indicating a spotted condition. Subsequently, as the peach half continues on its movement, all of the underside of the same included between the belts 22, 23 is viewed and scanned. Then later, when and as the peach half leaves the field of view, initially the photo cells 65, 66, 68 and 69 view the reflecting plate 73 again before the light from source 72 is allowed to shine into tube 67A and light tube 67.

*Description of control circuitry at inspection station 20*

Figure 13:
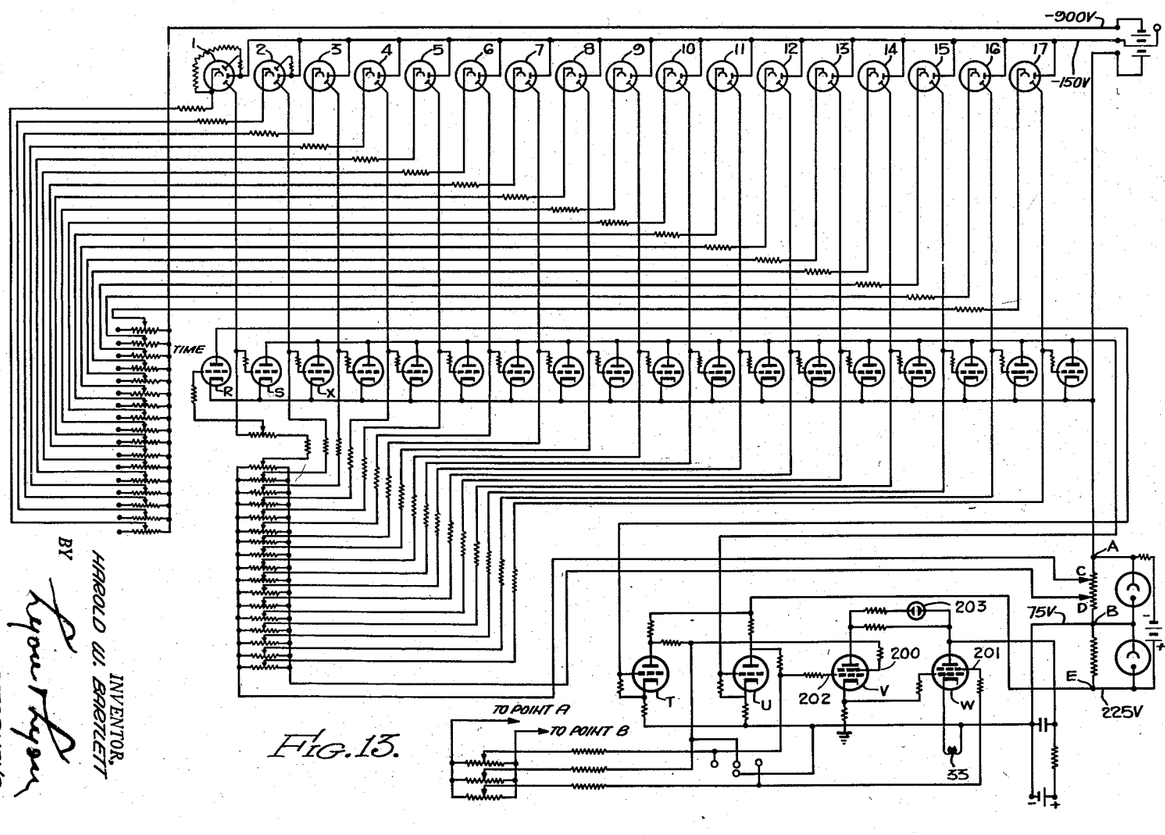
Figure 13 is a wiring diagram illustrating the manner in which the seventeen photo cells are interconnected with their associated electrometer tubes and control circuitry.

The control circuitry includes seventeen photo cells 1–17, both inclusive, each arranged to view a different portion of a peach half, with slight overlap, however, whereby such photo cells effectively scan different overlapping zones of the peach half as the same move through the scanning head.

The photo cell 1 serves a dual function, namely, a timing function and a viewing or scanning function, while the remaining photo cells 2–17, both inclusive, are used for performing a viewing or scanning function only.

Figure 14:
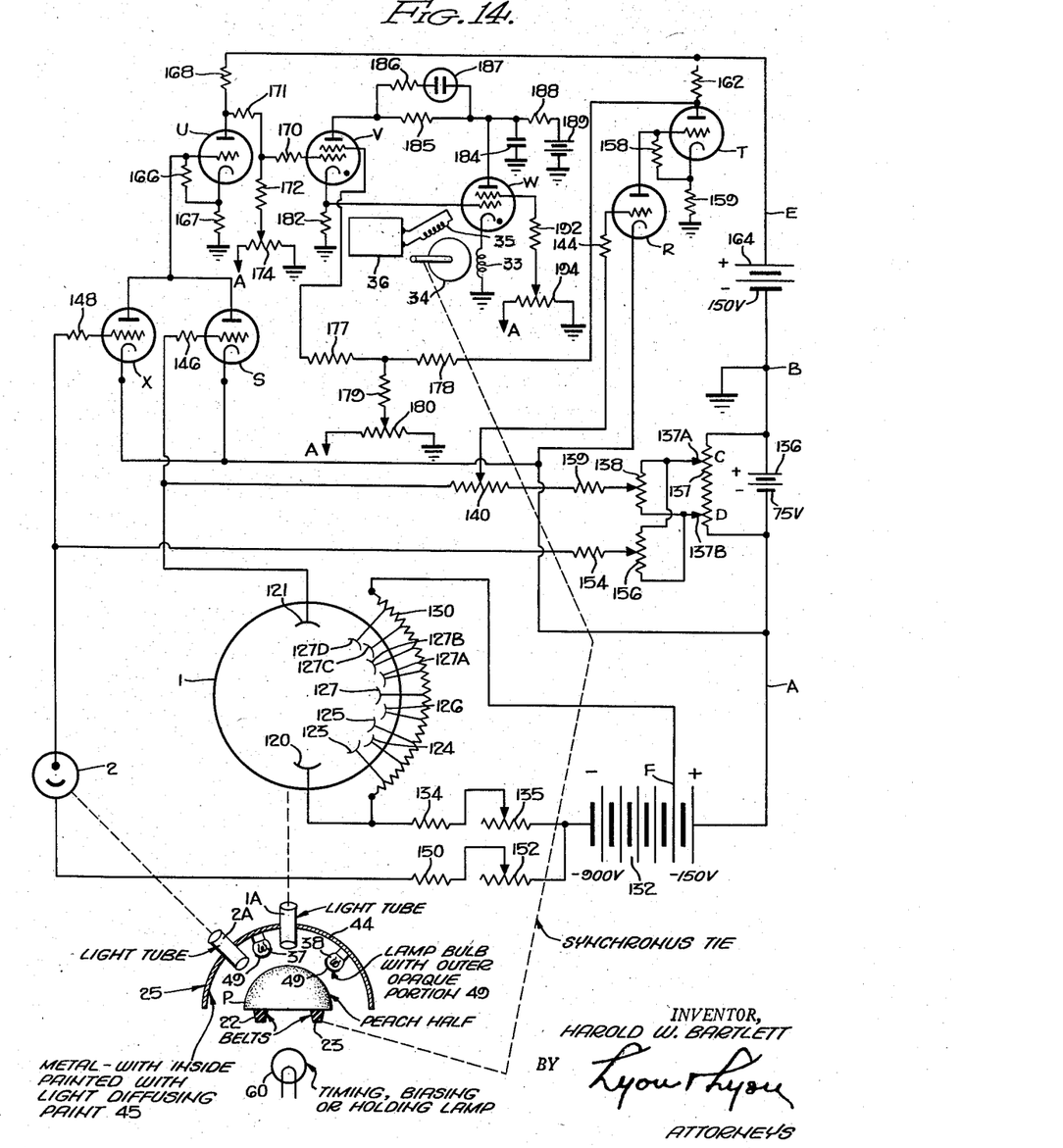
Figure 14 illustrates, in more simplified form, the arrangement of circuit components in Figure 13 in relationship to the scanning head.

Figure 13 shows the composite circuitry, whereas Figure 14 illustrates, in simplified form, the interrelationship between photo cells 1 and 2, it being understood that, for all intents and purposes, the photo cell 2 in the simplified figure is representative also of the other photo cells 3–17, both inclusive.

The photo cells are preferably of the RCA 931A type, i.e., a photomultiplier type of tube characterized by its sensitivity and its lack of response to infrared light which otherwise may produce detrimental effects, particularly since the chlorophyll content of the peach half causes copious amounts of infrared light to impinge on the photo cells.

The so-called dynodes of the photo cells are connected in similar manner in the different photo cells and for that reason only the particular connection of the dynodes with respect to photo cell 1 is described in detail, it being understood that the dynodes of the other photo cells are connected in similar fashion.

The photo cell 1 includes a cathode 120, an anode 121 and a series of nine dynodes 123, 124, 125, 126, 127, 127A, 127B, 127C, and 127D. The dynodes are connected to spaced points on a voltage dividing resistance 130 having one of its outside terminals connected to the cathode 120 and the other one of its terminals connected to the point F on the voltage source 132 of —150 volts. The voltage dropping resistance may comprise a series of resistances, each having a magnitude of 100,000 ohms, which is suitable for use at low levels of illumination. The negative terminal of the source 132 which is —900 volts is connected to the cathode 120 through a current limiting resistance 134 and a serially connected adjustable resistance 135. A terminal of the source 132 is connected to the anode 121 through an adjustable voltage dividing network which includes the source 136, the voltage dividing resistance 137, the potentiometer-type resistance 138, the fixed resistance 139 and the potentiometer-type resistance 140. The negative terminal of source 136 designated as the terminal A is connected to the positive terminal of the source 132 and is connected to one terminal of the voltage dividing resistance 137, the other terminal of the voltage dividing resistance 137 being connected to the grounded positive terminal of source 136 designated as terminal B. The voltage dividing resistance 137 may in fact comprise two serially connected potentiometer-type resistances with adjustable taps 137A and 137B contacting the resistance 137 at points C and D, respectively. These adjustable taps 137A and 137B are connected to the outside terminals of the potentiometer-type resistance 138 having its tap connected to the photo cell anode 121, which may be considered to have a zero voltage level, through the serially connected resistances 139 and 140. The adjustable tap on resistance 140 is connected to the control grid of the timing triode R through resistance 144 for effecting a control operation.

The timing triode R has its cathode connected to the terminal A. In similar manner the spot detection triode S has its control grid connected to the anode 121 through resistance 146 for also effecting a control operation in accordance with the current flowing to the photo cell in the circuit outlined immediately above. The cathode of the triode S for that purpose is connected to terminal A.

A second spot detection triode X is associated in similar manner with the photo cell 2. The cathode of the triode X is connected to the terminal A and the control grid of triode X is connected to the anode of photo cell 2 through resistance 148.

The photo cell 2 is connected to the source 132 in a similar manner as photo cell 1. Specifically, the cathode of photo cell 2 is connected through the current limiting resistance 150 and current adjusting resistance 152 to the negative terminal of source 132. The anode of photo cell 2 is connected to the positive terminal of source 132 through a network which includes: resistance 154, potentiometer-type resistance 156, the voltage dividing resistance 137 and source 136. The resistance 154 has one of its terminals connected to the adjustable tap on the resistance 156 which has its outside terminals connected respectively to the adjustable taps 137A and 137B.

It is observed that the other photo cells 3–17, both inclusive, are connected in a similar manner as photo cell 2 in parallel with photo cells 1 and 2 and that each of such photo cells 3–17 has a corresponding spot detection triode or electrometer tube corresponding to the triode X.

The timing triode R has its anode connected to the positive grounded terminal of source 136 through the serially connected resistances 158 and 159 so that space current may flow through the timing triode R. For control purposes, the resistance 158 is connected between the control grid and cathode of the control tube T and the resistance 159 is connected between the cathode of tube T and ground.

Tube T has its anode connected through the voltage dropping resistance 162 to the positive terminal of source 164, the negative terminal of source 164 being grounded so as to provide a path for the flow of space current through tube T.

Each of tubes S and X has its anode returned to the positive grounded terminal of source 136 through a serial circuit which includes the serially connected resistances 166 and 167, the resistance 166 being connected between the control grid and cathode of the control tube U and the resistance 167 being connected between the cathode of tube U and ground. The anode of tube U is connected to the positive terminal of source 164 through the voltage dropping resistance 168 so as to likewise provide a path for the flow of space current through tube U.

The voltages developed on the anodes of tubes U and T are used to control simultaneously the flow of space current through the control tube V. For that purpose, the control grid of tube V is connected to the anode of tube U through the resistances 170 and 171, the junction point of which is connected through resistance 172 to an adjustable tap on the potentiometer resistance 174 for bias purposes. Resistance 174 has one of its outside terminals grounded and the other one of its terminals connected to the terminal A. The screen grid of tube V is connected for the above-mentioned purpose to the anode of tube T through the serially connected resistances 177 and 178, the junction point of which is connected through resistance 179 to an adjustable tap on the potentiometer resistance 180. One outside terminal of resistance 180 is grounded and the other outside terminal is connected to terminal A.

Tube V operates essentially as a cathode follower and has its cathode returned to ground through resistance 182, while its anode is connected to the ungrounded terminal of the charged condenser 184 through a relatively low resistance 185 which is shunted by a serial circuit including the relatively high resistance 186 and glow tube 187. The condenser 184 has its ungrounded terminal connected through the charging resistance 188 to the positive ungrounded terminal of source 189.

The voltage developed on the cathode of tube V is applied by a direct connection to the control grid of tube W which has its cathode returned to ground through the magnetizing coil 33. The anode of tube W is connected to the positive ungrounded terminal of condenser 184 and the screen grid of the tube is connected through resistance 192 to the adjustable tap on the voltage dividing resistance 194 having one of its outside terminals grounded and the other one of its outside terminals connected to the terminal A.

The magnetizing coil 33, when energized as described herein, produces a so-called spot of magnetization on a magnetizable disk 34 which is rotated in synchronism with movement of the peach halves. The magnetized spot thus produced on the disk 34 causes a voltage to be induced in the pickup coil 35 after a predetermined time interval, and such voltage is used to operate an ejecting mechanism 36 which causes a spotted peach half to be ejected or segregated from the remaining peach halves that are not spotted.

The apparatus includes the magnetizable coil 33, rotatable disk 34, pickup coil 35 and ejecting mechanism 36 is preferably of the character described in my copending application, Serial No. 344,103, filed March 23, 1953, and assigned to the same assignee, and for that reason a detailed description of the same is deemed unnecessary in this application.

*Condition of control circuit when no peach half is being viewed*

In this particular condition, no peach half is in a position to be viewed by the seventeen photo cells, and in such case the light from the so-called timing, biasing or holding lamp 60, which is continuously energized, shines directly onto the photo cell 1 only thereby to reduce the resistance of the photo cell 1 to a minimum. Consequently, a relatively large current flows in the serial circuit which includes: the cathode 120, resistance 134, resistance 135, source 132, source 136, resistance 137, resistance 138, resistance 139, resistance 140 and the anode 121. Such relatively large current causes the control grids of the timing tube R and the spot detection tube S to have a relatively large negative value with the result that the anodes of tubes R and S have a relatively large positive potential. This relatively large positive potential on the anode of tube R causes relatively high conduction in the tube T; and likewise the relatively large positive voltage on the anode of tube S causes relatively large conduction in tube U thereby depressing the potentials on the anodes of tubes T and U, respectively. The potentials on the anodes of tubes T and U are applied to the screen grid and control grid, respectively, of the cathode follower tube V with result that a relatively small voltage appears across the cathode load resistance 182. This voltage across the load resistance 182, under these conditions, is insufficient to produce conduction in tube W with the result that substantially no current flows through the magnetizing coil 33.

*Condition of control circuit when spotless peach half is viewed*

In this particular condition, the peach half blocks the transmission of light from the timing, biasing or holding lamp 60, and thus such lamp 60 has no effect on the operation of the circuit. However, the light reflected from different portions of the peach half impinges on corresponding different photo cells 1–17. Such reflected light is of such intensity that the resistance of each of the photo cells decreases to such an extent that the voltage on the anodes of each of the photo cells is depressed sufficiently to maintain the control grid of tube W sufficiently low to maintain tube W in a nonconducting condition. These depressed voltages appearing on the corresponding anodes of the photo cells 1–17 are applied to the control grid of tubes corresponding to tubes S and X. Consequently, the voltages on the anodes of tubes S and X are relatively high to maintain the control grid of tube U at a relatively high positive potential and the anode of tube U at a relatively low potential. This relatively low potential on the anode of tube U is applied to the control grid of tube V to maintain the current flow through the cathode load resistance 182 at a relatively low value and thus the voltage on the control grid of tube W at a relatively low value so that tube W is not fired.

*Condition of control circuit when spotted peach half is viewed*

In this particular condition, the peach half blocks the transmission of light from the timing, biasing or holding lamp 60 and thus illumination from this source has no effect. When one of the photo cells represented, for example, by the photo cell 1 or 2 views or observes an objectionable spotted portion of a peach half, the light reflected from such spotted or objectionable portion causes the resistance of the corresponding photo cell to increase with the result that the potential on the anode of that particular photo cell increases. This increase in potential is transferred to the control grid of the spot detection tube S or X, as the case may be, to cause the voltage on the control grid of tube U to assume a relatively low value. As a result, the potential on the anode of tube U and the control grid of tube V assume a relatively large potential to cause a relatively large voltage to be developed across the cathode load resistance 182. This relatively large voltage drop across resistance 182 is transferred to the control grid of tube W to cause the same to conduct. When the tube W is in a conducting state, the precharged condenser 184 discharges through a path which includes the condenser 184, the tube W and the magnetizing coil 33 to produce a magnetized spot on the magnetizable disk 34. This magnetizable spot, after traveling to a position adjacent the pickup coil 35, induces a voltage therein of sufficient magnitude to cause operation of the ejecting mechanism 36 for purposes of ejecting or segregating the spotted peach half after it has traveled a predetermined distance from the scanning head. The peach half, of course, continuously moves under the scanning head and, after the spotted portion is out of view, the potential on the control grid of tube W assumes its normal relatively low value insufficient to institute conduction of tube W. Tube W is preferably a gaseous type of tube such as a thyratron and its anode voltage is sufficiently depressed, under the above-mentioned conditions, to restore the tube W to its normally nonconducting condition. To assure such restoration of the tube W to its nonconducting condition, the charging resistance 188 is sufficiently high.

The purpose of the magnetizable disk 34 is, of course, to introduce a time delay whereby the objectionable or spotted peach half may have traveled a predetermined distance away from the scanning head before ejection.

It is noted that the so-called holding lamp 60 is instrumental also in achieving a timing function as indicated previously. The so-called timing, biasing or holding lamp 60 prevents tubes from firing when there is no peach in the scanning position as described previously. The lamp 60 is referred to as a timing lamp in that it is instrumental in holding any information the spot detecting photocells may receive during the scanning interval and until the peach half leaves. As soon as the peach half leaves, the holding lamp 60 is uncovered and light therefrom shines directly onto the holding and timing photocell 1, at which time a spot is magnetized on the time delay disc, assuming, of course, that such peach half had a spotted surface.

Thus referring to Figure 13, with the peach half in the position wherein it is being scanned, tube R conducts, causing tube T to reduce its conductivity. This causes the screen grid 200 of tube V to become slightly more positive and the screen grid 201 of tube W to become slightly more negative. The potentials on these screen grids 200 and 201 are so adjusted that under this condition tube V does not conduct and tube W does not conduct. When a spot is being viewed by any one of the photocells, the conduction of tube U is reduced to cause the control grid 202 of tube V to become more positive, causing tube V to conduct. Tube V continues to conduct, and any further spots viewed by the same or a different photocell have no further effect on it. The neon tube 203 is for indication purposes to indicate conduction in tube V and is also useful for adjustment purposes. As soon as the holding or timing photocell 1 receives direct light from the holding lamp 60, such photocell 1 conducts to a greater extent, causing tube T to increase its conduction, to in turn cause the screen grid of tube W to become more positive so as to cause tube W to fire and place a spot on the time delay disc as mentioned previously. At the same time the screen grid 200 of tube V is rendered more negative to a point where the tube V will not fire even though a pulse be applied to the control grid 202 of tube V. When the tube W is fired to place a spot on the delay disc, the voltage drops to a point where both tubes V and W are extinguished. Thus, tube V cannot fire until there is a peach covering the holding light and a spot is viewed by a photocell; and tube W cannot fire unless tube V fires and the holding lamp 60 is uncovered.

Without this feature the coil 33 would receive an impulse for every spot on the peach which might indeed be several for each peach, with the result that the ejection valve would try to function several times for such peach. If, for example, a spot were on the leading or lagging edge of the peach, the air valve would fire at a corresponding time and the resulting air blast would not necessarily be directed toward the center of the peach half, with the possibility that the peach half would be missed entirely by the air blast or be deflected in an undesired direction. Without this feature, inspection could not occur at a relatively high rate. The machine would have to be slowed down and the peach halves fed to the same with a spacing between succeeding peach halves equal to the diameter of the peach half, and a much wider stream of injection air would be required.

*Control circuitry at inspection station 21*

In order to simplify the disclosure by avoiding duplication, details of the control circuitry associated with photo cells 65, 66, 67, 68 and 69 is not presented in the drawings. This is so since it is understood that the control circuitry for photo cells 65, 66, 67, 68 and 69 is identical with that described in connection with photo cells 1–17. Thus, it is understood that the timing and viewing photo cell 1 corresponds to photo cell 67, photo cell 2 corresponds to photo cell 65; photo cell 3 corresponds to photo cell 66; photo cell 4 corresponds to photo cell 68; photo cell 5 corresponds to photo cell 69; and for the instant purpose photo cells 6–17 and their associated electrometer tubes may be considered to be removed from the circuitry since only five photo cells are required. The operation of the circuitry then is considered the same as described above.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an arrangement of the character described, a scanning head at an inspection station, peach half conveying means for conveying a peach half with its convex side upwardly under said scanning head, means for illuminating said peach half, said scanning head including a plurality of photocells exceeding more than three in number, each photocell being effective to view a different portion of said convex side and controlled in accordance with the intensity of diffused light reflected from the corresponding particular portion to effect the measurement of such intensity with the area of a particular portion which is viewed by a particular photocell at any one particular time being in the order of 2% of the total convex surface area of the peach half, said photocells being spaced from each other along generally the direction of peach half travel as well as laterally of said direction such that each scans a different zone of said convex side in a scanning process in the movement of a peach half from a first position to a second position, said photocells being arranged so that the majority of them view the peach half at the instant said peach half is in said first position, said photocells being arranged so that they all view the peach half continuously in its movement from said first position to said second position, said photocells being so arranged that all portions of said convex side of the peach half are viewed, by at least one of said photocells, some time during said scanning process, at an angle less than 45°, said angle being the included angle defined by a line extending from the photocell to a point on the peach half and a normal passing through said point.

2. The arrangement set forth in claim 1 in which control means is coupled to said photocells and controlled in accordance with the intensity of light reflected onto said photocells, and means for rendering said control means ineffective when said peach half is outside the region defined by said first and second positions.

3. In an arrangement of the character described, a plurality of photocells exceeding three in number, each arranged to view a different portion of the convex side of a hemispherical article with the area of a particular portion which is viewed by a particular photocell at any one particular time being in the order of 2% of the total area of said convex side of said article, means producing relative movement between said article and said photocells, whereby different zones of said article are scanned by said photocells, said photocells being so arranged that all portions of said convex side of said article are viewed, by at least one of said photocells, some time during scanning by said photocells, at an angle less than 45°, said angle being the included angle defined by a line extending from the particular photocell to a point on said article and a normal passing through said point, control means coupled to said photocells for and energized in accordance with the intensity of light reflected from the article onto each of the different photocells, said photocells being spaced from each other along generally the direction of movement of said article as well as laterally of said direction so that they all continuously view the article in a range of movement during which said scanning occurs, and means rendering said control means ineffective when said article is outside said range of movement.

4. In an arrangement of the character described, a scanning head at an inspection station, article conveying means for conveying a hemispherical article with a convex side past said scanning head, means for illuminating said article at said inspection station, said scanning head including a plurality of photocells exceeding three in number, each of said photocells being effective to view a different portion of said convex side and controlled in accordance with the intensity of light reflected from the corresponding particular portion to effect the measurement of such intensity with the area of a particular portion which is viewed by a particular photocell at any one particular time being in the order of 2% of the total convex surface area of the article, said conveying means serving to move said article past said photocells such that each of said photocells scans a different zone of said convex side in a scanning process in the movement of the article from a first position to a second position, said photocells being so arranged that all portions of said convex side of said article are viewed, by at least one of said photocells, some time during said scanning process, at an angle less than 45°, said angle being the included angle defined by a line extending from the photocell to a point on the article and a normal passing through said point, a holding light source disposed and arranged to produce the beam of light directed into one of said photocells to illuminate the same, said article being in position during said scanning process to interrupt said light beam in said first position of said article and to allow transmission of said light in said second position of said article, said photocells being arranged so that the majority of them view the article at the instant when said light beam is interrupted in said first position of said article, said photocells being spaced from each other along generally the direction of movement of said article as well as laterally of said direction so that they all view said article continuously in its movement from said first position to said second position, utilization means coupled to and controlled by said photocells, said photocells being effective to energize said utilization means only when said article is between said first and second positions.

5. In apparatus of the character described, means arranged to illuminate a moving convex object having a generally circular cross section, a plurality of photocell means, exceeding three in number, each spaced from each other along generally the direction of movement of said object as well as laterally of said direction to receive light reflected from a different portion of said object, light diffusing means disposed between on the one hand, said object and, on the other hand, said illuminating means, and a plurality of apertures through each of which reflected light passes from said object to a corresponding one of said photocell means, each aperture having a projected area which is in the order of 2% of the projected area of said object, said photocell means viewing different but overlapping portions of said objects through said apertures, means for moving said object relative to said photocells whereby said object is scanned by said photocells, and said photocells being so arranged that all portions of said object are viewed, by at least one of said photocells, some time during scanning of the object by said photocells, at an angle less than 45°, said angle being the included angle defined by a line extending from the photocell to a point on the object and a normal passing through said point.

6. The arrangement set forth in claim 5 wherein means are associated with said photocell means for determining, while scanning substantially the entire object, the intensity of light reflected from the object, and means sorting the object when the light intensity so determined assumes a predetermined minimum.

7. The arrangement set forth in claim 5 wherein means are associated with said photocell means for determining, while scanning substantially the entire object, the intensity of light reflected from the object, means sorting the object when the light intensity so determined assumes a predetermined minimum, means for moving said object to be tested or inspected past a point of selection, whereby said object is illuminated by said diffused light, and means for impressing light on one of said photocell means when no object is at said point of selection, and means incorporating the last mentioned means for preventing operation of said sorting means until after said entire object has been scanned by said photocell means.

8. The arrangement set forth in claim 5 wherein means are associated with said photocell means for determining, at one particular time, the intensity of light reflected from the object, amplifying means connected to said photocell means and adapted to amplify current variations thereof, said photocell means being sensitive to light reflected from different but overlapping portions of said object, and electromagnetic means electrically related to said amplifying means and controlled when the light intensity so determined assumes a predetermined minimum value for directing objects which do not reflect, at one particular time, sufficient light, and means preventing the operation of said electromagnetic means until after said entire object has been completely scanned by said photocell means.

9. The arrangement set forth in claim 5 wherein means are associated with said photocell means for determining, while scanning substantially the entire object, the intensity of light reflected from the object, means for moving objects in spaced relationship to a point of selection, whereby each object is illuminated with diffused light, said photocell means being sensitive to the light reflected from different but overlapping portions of said object, electromagnetic means electrically related to said photocell means and controlled when the light intensity so determined assumes a predetermined minimum for directing an object which does not reflect, at one particular time, light having sufficient intensity, and means for maintaining the current output of one of said photocell means at a predetermined magnitude and for resetting said electromagnetic means when there is no object at said point of selection.

10. Apparatus of the character described comprising: a scanning head at an inspection station, peach half conveying means for conveying a peach half with its convex side upwardly under said scanning head, said scanning head having a light source mounted thereon, means for diffusing the light from said source prior to impingement on said peach half whereby said peach half is illuminated by diffused light, said scanning head including a plurality of photocells exceeding three in number and of substantially equal sensitivity, an elongated light tube disposed between a photocell and a peach half for directing reflected light from the peach half onto the photocell, each photocell being effective to view a different portion of said convex side and controlled in accordance with the intensity of diffused light in the range of 500 to 700 millimicrons reflected from the particular portion to effect a measurement of such intensity with the area of a particular portion which is viewed by a particular photocell at any one particular time being in the order of 2% of the total convex surface area of the peach half, said photocells being relatively insensitive to reflections in the infrared region, said conveying means serving to move said peach half past the photocells such that each of said photocells scan a different zone of said convex side of the scanning process in the movement of a peach half from a first position to a second position, said photocells being so arranged that all portions of said convex side are viewed by at least one of said photocells some time during said scanning process at an angle less than 45°, said angle being the included angle defined by a line extending from the photocell to a point on the peach half and a normal passing through said point, a holding light source disposed between said conveying means and arranged to produce a beam of light directed upwardly into one of said photocells to illuminate the same, said peach half being in position during said scanning process to interrupt said light beam in said first position of said peach half and to allow transmission of said light in said second position of said peach half, said photocells being spaced from each other along generally the direction of peach half travel as well as laterally of said direction so that the majortiy of them view the peach half at the instant when the light beam is interrupted in said first position of said peach half, said photocells being arranged so that all view the peach half continuously in its movement from said first position to said second position, a separate electrometer tube for each photocell, each electrometer tube having a control element and an output electrode, a separate space current path for each photocell, means coupling each path to a corresponding control element of a corresponding electrometer tube to control the conduction therein, a common output impedance coupled to the output electrode of said electrometer tubes, a first control tube having a control electrode and an output electrode, means coupling said control electrode to the space current path of said one photocell illuminated by said light beam, a second control tube having a pair of control electrodes, means coupling said common output impedance to one of said pair of electrodes, means coupling said control electrode of said first control tube to the other one of said pair of control electrodes, utilization means coupled to said second control tube and energized in accordance with the voltage applied to said pair of control electrodes, said photocells being effective to energize said utilization means only when said peach half is between said first and second positions, and means for maintaining said utilization means energized, once it is energized, by said photocells until said peach half reaches said second position.

11. In an arrangement of the character described, a scanning head at an inspection station, peach half conveying means for conveying a peach half with its convex side upwardly under said scanning head, said scanning head having a light source mounted therein, means for diffusing the light from said source prior to impingement on said peach half whereby said peach half is illuminated with diffused light, said scanning head including a plurality of photocells exceeding three in number and of substantially equal sensitivity, an elongated light tube disposed between a photocell and said peach half for directing reflected light from said peach half onto the corresponding photocell, each photocell being effective to view a different portion of said convex side and controlled in accordance with the intensity of diffused light in the range of 500 to 700 millimicrons reflected from the particular portion to effect a measurement of such intensity with the area of a particular portion which is viewed by a particular photocell at any one particular time being in the order of 2% of the total convex surface area of the peach half, said conveying means serving to move said peach half past said photocells such that each of such photocells scans a different zone of said convex side in a scanning process in the movement of the peach half from a first position to a second position, said photocells being so spaced from each other along generally the direction of peach half travel as well as laterally of said direction that all portions of said convex side are viewed, some time during said scanning process at an angle less than 45°, said angle being the included angle defined by a line extending from the photocell to a point on the peach half and a normal passing through said point, said photocells being arranged so that the majortiy of them view the peach half at the instant said peach half reaches said first position, said photocells being arranged so that they all view the peach half continuously in its movement from its first position to its second position.

12. In an arrangement of the character described, a scanning head at an inspection station, article conveying means for conveying a hemispherical article with its convex side adjacent said scanning head, means for illuminating said convex side, said scanning head including a plurality of photocells exceeding more than three in number, each photocell being effective to view a different portion of said convex side and controlled in accordance with the intensity of diffused light reflected from the corresponding particular portion to effect measurement of such intensity with the area of a particular portion which is viewed by a particular photocell at any one particular time being in the order of ten times the area of a spot on said article which is to be detected, said photocells being spaced from each other along generally the direction of article travel as well as laterally of said direction such that each scans a different zone of said convex side in a scanning process in the movement of an article from a first position to a second position, said photocells being arranged so that the majority of them view the article at the instant said article is in said first position, said photocells being arranged so that they all view the article continuously in its movement from said first position to said second position, said photocells being so arranged that all portions of said convex side of the article are viewed, by at least one of said photocells, some time during said scanning process, at an angle less than 45°, said angle being the included angle defined by a line extending from the photocell to a point on the article and a normal passing through said point.

References Cited in the file of this patent

UNITED STATES PATENTS

| | | |
|---|---|---|
| 1,940,882 | Rich | Dec. 26, 1933 |
| 1,943,278 | Thompson | Jan. 9, 1934 |
| 2,131,095 | Cox | Sept. 27, 1938 |
| 2,137,187 | Stoate | Nov. 15, 1938 |
| 2,244,826 | Cox | June 10, 1941 |
| 2,415,177 | Hurley | Feb. 4, 1947 |
| 2,570,288 | Todd | Oct. 9, 1951 |
| 2,645,343 | Nemer | July 14, 1953 |
| 2,656,923 | Cox | Oct. 27, 1953 |
| 2,696,297 | Matthews | Dec. 7, 1954 |

FOREIGN PATENTS

| | | |
|---|---|---|
| 708,513 | Great Britain | May 5, 1954 |